Patented Jan. 26, 1937

2,068,935

UNITED STATES PATENT OFFICE 2,068,935

RUBBER COMPOUNDING

Albert A. Somerville, Flushing, N. Y., assignor to R. T. Vanderbilt Company, Incorporated, New York, N. Y., a corporation of New York No Drawing. Application November 14, 1935, Serial No. 49,737

4 Claims. (Cl. 18—50)

My invention relates to improvements in the manufacture of vulcanized rubber products. In one aspect, my invention relates to the development of improved fatigue resistance in vulcanized rubber products. In this aspect, my present invention is an improvement on the broader invention described and claimed in my application filed December 5, 1934, Serial Number 756,075.

I have discovered that, by using a hydroxyquinol, and particularly 1,2,4-trihydroxybenzene, and an organic base such as an ethanolamine in conjunction with catalytic antioxidants such as phenylbetanaphthylamine, I can produce vulcanized rubber products in which both resistance to aging and resistance to fatigue are developed to a high degree. In this aspect, the process of my invention comprises, essentially, the vulcanization of a rubber compound including 1,2,4-trihydroxybenzene, an organic base and a catalytic anti-oxidant and the product of my invention comprises, essentially, the product of such vulcanization. The differences between resistance to aging and resistance to fatigue, as properties of vulcanized rubber compounds, and the problems involved in developing these properties jointly in the same vulcanized rubber compound are outlined in my prior application, above identified, and for that reason are not repeated here.

1,2,4-trihydroxybenzene is sometimes designated, although less precisely, by other terms such as hydroxyhydroquinone, oxyhydroquinone and oxyquinol. 1,2,4-trihydroxybenzene is correctly designated as an hydroxyquinol.

Hydroxyquinols, and particularly 1,2,4-trihydroxybenzene may be used as a substitute for any of the oxygen absorbers specifically mentioned in my said prior application in the processes and in the production of the products there described.

I have found 1,2,4-trihydroxybenzene to be more active as an oxygen absorber, for the purposes of my invention, than hydroquinone, to be substantially as active as pyrogallol and in general to enjoy the advantages, for the purposes of my invention, of mixtures of pyrogallol and hydroquinone.

The organic bases useful for the purposes of my invention are those non-volatile at the vulcanization temperature, miscible with rubber and effective to activate the hydroxyquinol as an oxygen absorber. Such organic bases include monoethanolamine, diethanolamine, triethanolamine, dibutylamine, tributylamine, diamylamine, dibenzylamine and aniline. The catalytic antioxidants useful for the purposes of my invention are those effective to inhibit oxidation of the vulcanized rubber product by the oxygen content of the atmosphere to which it may be exposed Such catalytic anti-oxidants include the aromatic secondary amines, or the reaction products of aromatic amines with aldehydes or the reaction products of aromatic amines with ketones, more particularly, diphenylamine, the ditolylamines, phenylalphanaphthylamine, phenylbetanaphthylamine, diphenylparaphenylenediamine, dibetanaphthylparaphenylenediamine, the reaction product of acetaldol with alphanaphthylamine, the reaction product of diphenylamine with acetone and the reaction products of acetone with aniline.

My invention will be further illustrated by the following examples including processes embodying my invention, processes producing products embodying my invention. The examples designated by number illustrate my invention. The examples designated by letter are given for purposes of comparison.

The following Compounds A to F inclusive and 1 to 12 inclusive were compounded in the usual manner, the hydroxyquinol, in Compounds 1 to 12, being incorporated as such or as a mixture with the organic base after incorporation of the other compounding materials.

Compound A consisted of:

| | Parts (by weight) |
|---|---|
| Smoked sheets | 100 |
| Stearic acid | 4 |
| Pine tar | 2 |
| Zinc oxide | 5 |
| Carbon black | 45 |
| Sulfur | 3 |
| Mercaptobenzothiazole (accelerator) | 1 |

Compound B was the same as compound A except for the inclusion of 1 part of phenylbetanaphthylamine (antioxidant). Compound C consisted of:

| | Parts (by weight) |
|---|---|
| Smoked sheets | 100 |
| Soft carbon black | 40 |
| Zinc oxide | 10 |

| | Parts (by weight) |
|---|---|
| Stearic acid | 1 |
| Paraffin | 0.5 |
| Phenylbetanaphthylamine | 1 |
| Aldolalphanaphthylamine reaction products (anti-oxidant) | 1 |
| Sulfur | 0.6 |
| Mercaptobenzothiazole (accelerator) | 1.5 |
| Tetramethylthiuramdisulfide do | 0.25 |

Compound D consisted of:

| | Parts (by weight) |
|---|---|
| Smoked sheets | 100 |
| Calcium carbonate coated with 3% (by weight) of stearic acid | 35 |
| Zinc oxide | 10 |
| Red oxide of iron (color pigment) | 2.5 |
| Stearic acid | 0.5 |
| Paraffin | 0.5 |
| Phenylbetanaphthylamine (anti-oxidant) | 1 |
| Aldolalphanaphthylamine reaction products (anti-oxidant) | 1 |
| Sulfur | 0.75 |
| Mercaptobenzothiazole (accelerator) | 0.75 |
| Tetramethylthiuramdisulfide (accelerator) | 0.15 |
| Tellurium | 0.5 |
| Benzothiazyldisulfide (accelerator) | 0.75 |

Compound E was the same as Compound A except for substitution of 1 part of benzothiazyldisulfide for the mercaptobenzothiazole, and Compound F was the same as Compound B except for the substitution of 1 part of benzothiazyldisulfide for the mercaptobenzothiazole.

Compounds 1, 2, 3, and 4 were the same as Compound B except for the inclusion of 0.75 parts of 1,2,4-trihydroxybenzene in Compound 1, of 0.75 parts of 1,2,4-trihydroxybenzene and 0.25 parts of monoethanolamine in Compound 2, of 0.5 parts of 1,2,4-trihydroxybenzene in Compound 3, and of 0.5 parts of 1,2,4-trihydroxybenzene and 0.25 parts of monoethanolamine in Compound 4. Compounds 5 and 6 were the same, respectively, as Compound F except for the inclusion of 0.75 parts of 1,2,4-trihydroxybenzene in Compound 5, and of 0.7 parts of 1,2,4-trihydroxybenzene and 0.25 parts of monoethanolamine in Compound 6. In another aspect, Compounds 5 and 6 were the same, respectively, as Compounds 1 and 2 except for the substitution of 1 part of benzothiazyldisulfide for the mercaptobenzothiazole. Compounds 7 and 8 were the same as Compound A except for the inclusion of 0.5 parts of 1,2,4-trihydroxybenzene in Compound 7, and of 0.5 parts of 1,2,4-trihydroxybenzene and 0.25 parts of monoethanolamine in Compound 8. Compounds 9 and 10 were the same as Compound E except for the inclusion of 0.75 parts of 1,2,4-trihydroxybenzene in Compound 9, and of 0.75 parts of 1,2,4-trihydroxybenzene and 0.25 parts of monoethanolamine in Compound 10. Compounds 11 and 12 were the same, respectively, as Compounds C and D except for the inclusion in each of 1 part of 1,2,4-trihydroxybenzene and 0.5 parts of monoethanolamine.

The seven test slabs, samples, and test pieces, samples, for determining resistance to fatigue in flexure as hereinafter described were vulcanized in a platen press at 135° C. or 153° C. for periods varying from 4 minutes to 120 minutes. Samples of Compounds, A, B, E, and F and 1, 2, 3, 4, 5, 6, 7, 8, 9, and 10 were vulcanized at 135° C. for 30 minutes, 45 minutes, 60 minutes and 120 minutes. Samples of Compounds C and D and 11 and 12 were vulcanized at 153° C. for 4 minutes, 8 minutes and 16 minutes.

In the following tabulations, values for physical properties for each compound are in the order of increasing periods of vulcanization. In these tabulations, the values for stress at 300% elongation, in pounds per square inch, appear under the caption (a), for tensile strength, in pounds per square inch, under the caption (b), and for the percentage elongation at break under the caption (c), and the values for fatigue resistance, determined as hereinafter described, after 50,000 complete cycles of flexure, after 100,000 cycles, after 150,000 cycles and after 200,000 cycles appear under the captions (j), (k), (l), and (m), respectively. Also in these tabulations, the same values after 4 days of accelerated aging in the oxygen bomb appear under the captions (aa), (bb), (cc), (jj), (kk), (ll), and (mm), respectively.

Fatigue resistance is conveniently measured in the DeMattia fatigue testing machine in accordance with conventional practice. For the purpose of measuring resistance to flex cracking on flexure, the test is conveniently carried out as follows, and the comparisons herein made with respect to flex cracking are based upon tests so carried out: Test pieces are molded as rectangular blocks 6" x 1" x ¼" with an indentation transversely across one flat side of the piece at its center produced by the insertion into the mold, of a half round steel bar of $\frac{3}{32}$" radius. With the slides of the testing machine positioned 4 inches apart at maximum separation, the test pieces are clamped between them unstressed. The test pieces are then flexed, so as to stress the indented side of the test piece under tension, by operation of the testing machine. The test pieces, bent double through the indentation to expose the surface of the indentation, are periodically graded against a series of eleven samples, similarly bent, showing progressively deterioration from no flex cracks to complete rupture and marked in the same order 0, 1, 2, 3, 4, 5, 6, 7, 8, 9, 10. A test piece corresponding to the first standard is marked "0", the one corresponding to the fourth is marked "3", and so on. In the examples herein, the figures on fatigue resistance are given the grading of individual samples and as the summation of the gradings of 3 or 4 samples, the grading "10", "30" or "40", respectively, thus indicating complete rupture of the test piece or of all three or four test pieces and progressively lower gradings indicating progressively better resistance to fatigue in flexure.

*Compound A*

| (a) | (b) | (c) | (j) | (k) | (l) | (m) |
|---|---|---|---|---|---|---|
| 1200 | 4155 | 615 | 2 | 6 | 9 | 10 |
| 1535 | 4405 | 580 | 2 | 7 | 9 | 10 |
| 1730 | 4170 | 500 | 2 | 5 | 10 | 10 |
| 2020 | 4170 | 495 | 8 | 10 | 10 | 10 |
| Summation (4 tests) | | | 14 | 28 | 38 | 40 |

| (aa) | (bb) | (cc) | (jj) | (kk) | (ll) | (mm) |
|---|---|---|---|---|---|---|
| 745 | 1180 | 440 | 8 | 9 | 10 | 10 |
| 805 | 890 | 340 | 8 | 10 | 10 | 10 |
| 825 | 825 | 300 | 10 | 10 | 10 | 10 |
| ------ | 625 | 260 | 10 | 10 | 10 | 10 |
| Summation (4 tests) | | | 36 | 39 | 40 | 40 |

Compound B

| (a) | (b) | (c) | (j) | (k) | (l) | (m) |
|---|---|---|---|---|---|---|
| 1260 | 4410 | 630 | 0 | 4 | 5 | 7 |
| 1530 | 4455 | 585 | 0 | 2 | 3 | 5 |
| 1755 | 4710 | 575 | 0 | 2 | 2 | 4 |
| 2130 | 4140 | 510 | 1 | 3 | 8 | 10 |
| Summation (4 tests) | | | 1 | 11 | 18 | 26 |

| (aa) | (bb) | (cc) | (jj) | (kk) | (ll) | (mm) |
|---|---|---|---|---|---|---|
| 1165 | 2960 | 600 | 2 | 3 | 4 | 6 |
| 1380 | 3000 | 560 | 2 | 3 | 5 | 7 |
| 1495 | 2770 | 500 | 3 | 5 | 9 | 10 |
| 1625 | 2190 | 400 | 5 | 10 | 10 | 10 |
| Summation (4 tests) | | | 12 | 21 | 28 | 33 |

Compound C

| (a) | (b) | (c) | (j) | (k) | (l) |
|---|---|---|---|---|---|
| 1260 | 3360 | 710 | 2 | 7 | 10 |
| 1285 | 3405 | 700 | 0 | 1 | 1 |
| 1260 | 3235 | 695 | 2 | 7 | 10 |
| Summation (3 tests) | | | 4 | 15 | 21 |

Compound D

| (a) | (b) | (c) | (j) | (k) | (l) |
|---|---|---|---|---|---|
| 895 | 3095 | 730 | 2 | 8 | 10 |
| 885 | 3100 | 730 | 2 | 7 | 9 |
| 825 | 2910 | 725 | 4 | 10 | 10 |
| Summation (3 tests) | | | 8 | 25 | 29 |

Compound E

| (a) | (b) | (c) | (j) | (k) | (l) | (m) |
|---|---|---|---|---|---|---|
| 980 | 3390 | 600 | 0 | 1½ | 4 | 8 |
| 1415 | 4110 | 535 | 0 | 2 | 4 | 9 |
| 1570 | 4350 | 520 | 1 | 3 | 5 | 9 |
| 1990 | 4020 | 480 | 3 | 10 | 10 | 10 |
| Summation (4 tests) | | | 4 | 16½ | 23 | 36 |

| (aa) | (bb) | (cc) | (jj) | (kk) | (ll) | (mm) |
|---|---|---|---|---|---|---|
| 660 | 1125 | 460 | 4 | 9 | 10 | 10 |
| 830 | 965 | 365 | 5 | 10 | 10 | 10 |
| 875 | 895 | 310 | 10 | 10 | 10 | 10 |
| | 680 | 220 | 10 | 10 | 10 | 10 |
| Summation (4 tests) | | | 29 | 39 | 40 | 40 |

Compound F

| (a) | (b) | (c) | (j) | (k) | (l) | (m) |
|---|---|---|---|---|---|---|
| 985 | 3770 | 640 | 0 | 1½ | 3 | 4 |
| 1350 | 4200 | 585 | 0 | 1 | 1½ | 3 |
| 1505 | 4130 | 575 | 0 | 0 | 2 | 3 |
| 1975 | 4120 | 500 | 0 | 1 | 2 | 3 |
| Summation (4 tests) | | | 0 | 3½ | 8½ | 13 |

| (aa) | (bb) | (cc) | (jj) | (kk) | (ll) | (mm) |
|---|---|---|---|---|---|---|
| 945 | 2790 | 610 | 1 | 1½ | 2 | 4 |
| 1315 | 2650 | 515 | 1½ | 3 | 4 | 8 |
| 1405 | 2780 | 515 | 3 | 7 | 9 | 10 |
| 1670 | 2300 | 400 | 10 | 10 | 10 | 10 |
| Summation (4 tests) | | | 15½ | 21½ | 25 | 32 |

Compound 1

| (a) | (b) | (c) | (j) | (k) | (l) | (m) |
|---|---|---|---|---|---|---|
| 1085 | 4030 | 620 | 0 | 2 | 2 | 4 |
| 1390 | 4410 | 600 | 1 | 3 | 4 | 6 |
| 1625 | 4610 | 585 | 0 | 2 | 3 | 4 |
| 1935 | 4530 | 540 | 1 | 2 | 4 | 5 |
| Summation (4 tests) | | | 2 | 9 | 13 | 19 |

| (aa) | (bb) | (cc) | (jj) | (kk) | (ll) | (mm) |
|---|---|---|---|---|---|---|
| 995 | 2910 | 605 | 2 | 2 | 3 | 4 |
| 1200 | 2870 | 545 | 1 | 2 | 3 | 4 |
| 1365 | 2850 | 535 | 2 | 4 | 6 | 8 |
| 1580 | 2390 | 425 | 3 | 6 | 9 | 10 |
| Summation (4 tests) | | | 8 | 14 | 21 | 26 |

Compound 2

| (a) | (b) | (c) | (j) | (k) | (l) | (m) |
|---|---|---|---|---|---|---|
| 1315 | 4260 | 595 | 1 | 2 | 2 | 3 |
| 1530 | 4510 | 575 | 0 | 2 | 2 | 3 |
| 1780 | 4760 | 580 | 0 | 1 | 2 | 3 |
| 2010 | 4660 | 530 | 0 | 1 | 3 | 4 |
| Summation (4 tests) | | | 1 | 6 | 9 | 13 |

| (aa) | (bb) | (cc) | (jj) | (kk) | (ll) | (mm) |
|---|---|---|---|---|---|---|
| 1220 | 2950 | 555 | 1 | 1 | 2 | 3 |
| 1390 | 2880 | 520 | 0 | 2 | 2 | 4 |
| 1515 | 2870 | 505 | 2 | 4 | 8 | 10 |
| 1680 | 2370 | 400 | 2 | 4 | 10 | 10 |
| Summation (4 tests) | | | 5 | 11 | 22 | 27 |

Compound 3

| (a) | (b) | (c) | (j) | (k) | (l) | (m) |
|---|---|---|---|---|---|---|
| 1390 | 4410 | 600 | 1 | 2 | 3 | 4 |
| 1635 | 4630 | 580 | 1 | 2 | 3 | 6 |
| 1835 | 4650 | 555 | 0 | 2 | 3 | 5 |
| 2130 | 4560 | 515 | 1 | 2 | 4 | 6 |
| Summation (4 tests) | | | 3 | 8 | 13 | 21 |

Compound 4

| (a) | (b) | (c) | (j) | (k) | (l) | (m) |
|---|---|---|---|---|---|---|
| 1670 | 4790 | 600 | 0 | 1 | 2 | 3 |
| 1855 | 4730 | 570 | 1 | 1 | 2 | 3 |
| 2040 | 4840 | 530 | 0 | 1 | 2 | 3 |
| 2230 | 4420 | 580 | 1 | 2 | 4 | 9 |
| Summation (4 tests) | | | 2 | 5 | 10 | 18 |

Compound 5

| (a) | (b) | (c) | (j) | (k) | (l) | (m) |
|---|---|---|---|---|---|---|
| 945 | 3530 | 640 | 0 | 0 | 1 | 2 |
| 1230 | 4040 | 605 | 0 | 0 | 1 | 1½ |
| 1350 | 4090 | 590 | 0 | 0 | 1 | 1½ |
| 1820 | 4260 | 545 | 0 | 0 | 1½ | 2 |
| Summation (4 tests) | | | 0 | 0 | 4½ | 7 |

| (aa) | (bb) | (cc) | (jj) | (kk) | (ll) | (mm) |
|---|---|---|---|---|---|---|
| 930 | 2590 | 585 | 1 | 1 | 2 | 3 |
| 1215 | 2580 | 550 | 1 | 2 | 3 | 8 |
| 1275 | 2660 | 525 | 1½ | 2 | 6 | 9 |
| 1540 | 2350 | 430 | 2 | 6 | 8 | 10 |
| Summation (4 tests) | | | 5½ | 13 | 19 | 30 |

*Compound 6*

| (a) | (b) | (c) | (j) | (k) | (l) | (m) |
|---|---|---|---|---|---|---|
| 1200 | 4120 | 625 | 0 | 0 | 1½ | 2 |
| 1370 | 4360 | 585 | 0 | 0 | 1 | 1½ |
| 1555 | 4210 | 565 | 0 | 1 | 2 | 3 |
| 1865 | 4340 | 530 | 0 | 0 | 1 | 1½ |
| Summation (4 tests) | | | 0 | 1 | 5½ | 8 |

| (aa) | (bb) | (cc) | (jj) | (kk) | (ll) | (mm) |
|---|---|---|---|---|---|---|
| 1205 | 2910 | 560 | 1 | 1 | 2 | 4 |
| 1495 | 2830 | 520 | 0 | 1½ | 3 | 5 |
| 1495 | 2750 | 470 | 1½ | 4 | 7 | 9 |
| 1710 | 2370 | 410 | 2 | 5 | 8 | 10 |
| Summation (4 tests) | | | 4½ | 11½ | 20 | 28 |

*Compound 7*

| (a) | (b) | (c) | (j) | (k) | (l) | (m) |
|---|---|---|---|---|---|---|
| 1330 | 4230 | 600 | 2 | 4 | 10 | 10 |
| 1625 | 4620 | 585 | 2 | 6 | 10 | 10 |
| 1875 | 4750 | 565 | 2 | 5 | 10 | 10 |
| 2150 | 4400 | 500 | 2 | 7 | 10 | 10 |
| Summation (4 tests) | | | 8 | 22 | 40 | 40 |

*Compound 8*

| (a) | (b) | (c) | (j) | (k) | (l) | (m) |
|---|---|---|---|---|---|---|
| 1630 | 4750 | 600 | 2 | 4 | 8 | 10 |
| 1885 | 4630 | 545 | 2 | 4 | 9 | 10 |
| 1985 | 4610 | 530 | 2 | 5 | 10 | 10 |
| 2160 | 4180 | 465 | 3 | 10 | 10 | 10 |
| Summation (4 tests) | | | 9 | 23 | 37 | 40 |

*Compound 9*

| (a) | (b) | (c) | (j) | (k) | (l) | (m) |
|---|---|---|---|---|---|---|
| 895 | 3330 | 625 | 0 | 1 | 2 | 4 |
| 1135 | 3930 | 615 | 0 | 1 | 2 | 5 |
| 1340 | 3990 | 585 | 0 | 2 | 3 | 7 |
| 1780 | 4070 | 530 | 1 | 3 | 8 | 10 |
| Summation (4 tests) | | | 1 | 7 | 15 | 26 |

| (aa) | (bb) | (cc) | (jj) | (kk) | (ll) | (mm) |
|---|---|---|---|---|---|---|
| 670 | 1405 | 510 | 3 | 9 | 10 | 10 |
| 815 | 1255 | 450 | 8 | 10 | 10 | 10 |
| 1145 | 1490 | 490 | 9 | 10 | 10 | 10 |
|  | 900 | 290 | 10 | 10 | 10 | 10 |
| Summation (4 tests) | | | 30 | 39 | 40 | 40 |

*Compound 10*

| (a) | (b) | (c) | (j) | (k) | (l) | (m) |
|---|---|---|---|---|---|---|
| 1095 | 3940 | 625 | 0 | 0 | 1½ | 3 |
| 1380 | 4090 | 575 | 0 | 1½ | 3 | 6 |
| 1510 | 4020 | 555 | 0 | 2 | 4 | 9 |
| 1850 | 4280 | 525 | 1 | 2 | 9 | 10 |
| Summation (4 tests) | | | 1 | 5½ | 17½ | 28 |

| (aa) | (bb) | (cc) | (jj) | (kk) | (ll) | (mm) |
|---|---|---|---|---|---|---|
| 830 | 1515 | 470 | 2 | 9 | 10 | 10 |
| 970 | 1375 | 415 | 9 | 10 | 10 | 10 |
| 1005 | 1195 | 365 | 10 | 10 | 10 | 10 |
|  | 900 | 290 | 10 | 10 | 10 | 10 |
| Summation (4 tests) | | | 31 | 39 | 40 | 40 |

*Compound 11*

| (a) | (b) | (c) | (j) | (k) | (l) |
|---|---|---|---|---|---|
| 1065 | 2690 | 710 | 0 | 2 | 2 |
| 1075 | 2395 | 685 | 0 | 0 | 1 |
| 1030 | 2415 | 695 | 0 | 1 | 1 |
| Summation (3 tests) | | | 0 | 3 | 4 |

*Compound 12*

| (a) | (b) | (c) | (j) | (k) | (l) |
|---|---|---|---|---|---|
| 695 | 2635 | 775 | 0 | 3 | 4 |
| 625 | 2280 | 740 | 0 | 1 | 4 |
| 645 | 2325 | 755 | 0 | 4 | 5 |
| Summation (3 tests) | | | 0 | 8 | 13 |

Although, in practicing the process of my invention, the rubber compounds, as compounded, are normally dry, the catalytic anti-oxidants and the hydroquinol being incorporated as such, the compounding is carried out in the usual manner, with no special precautions to exclude moisture, from the atmosphere for example, making it probable that moisture is present to the extent in which it is usually encountered, in amounts of the order of 0.5% by weight of the compound for example.

I claim:

1. In the manufacture of vulcanized rubber products, the improvement which comprises subjecting to vulcanization a rubber compound including a hydroxyquinol, an organic base nonvolatile at the vulcanization temperature and miscible with rubber effective to activate the hydroxyquinol as an oxygen absorber and a catalytic anti-oxidant.

2. In the manufacture of vulcanized rubber products, the improvement which comprises subjecting to vulcanization a rubber compound including 1,2,4-trihydroxybenzene, an organic base nonvolatile at the vulcanization temperature and miscible with rubber effective to activate the hydroxyquinol as an oxygen absorber and a catalytic anti-oxidant.

3. The product of vulcanization of a rubber compound including a hydroxyquinol, an organic base nonvolatile at the vulcanization temperature and miscible with rubber effective to activate the hydroxyquinol as an oxygen absorber and a catalytic anti-oxidant.

4. The product of vulcanization of a rubber compound including 1,2,4-trihydroxybenzene, an organic base nonvolatile at the vulcanization temperature and miscible with rubber effective to activate the hydroxyquinol as an oxygen absorber and a catalytic anti-oxidant.

ALBERT A. SOMERVILLE.